United States Patent Office 3,443,336
Patented May 13, 1969

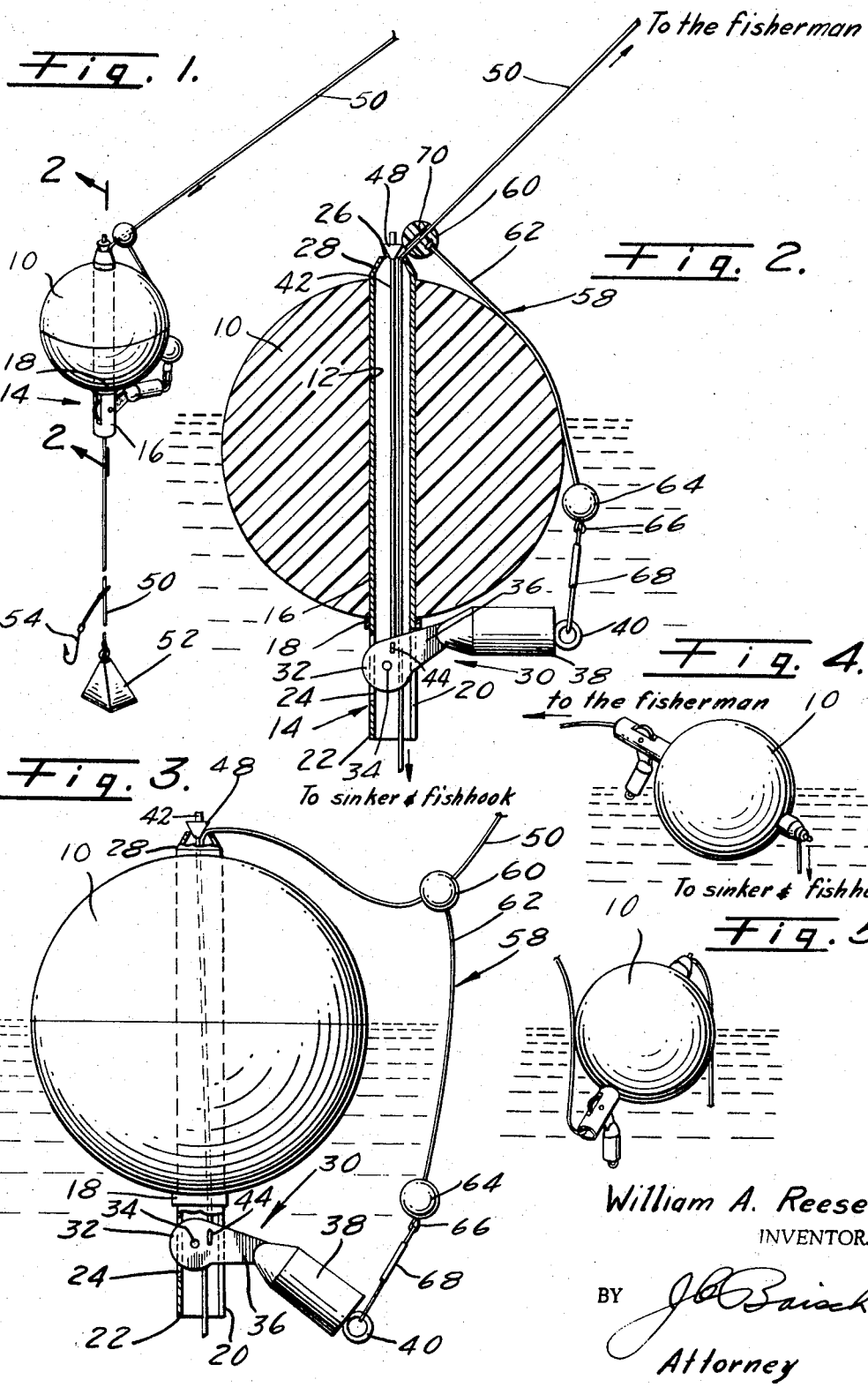

3,443,336
FISHING DEVICE
William Aubrey Reese, 14653 Rosecrans, Apt. 1,
La Mirada, Calif. 90638
Filed May 5, 1967, Ser. No. 636,527
Int. Cl. A01k *93/00*
U.S. Cl. 43—44.88    8 Claims

ABSTRACT OF THE DISCLOSURE

A fishing line float with line brake and hook depth adjustment. A spindle assembly extends vertically through the float, the spindle being tubular with open ends. The brake mechanism comprises a lever pivoted to the spindle adjacent one end, the lever being connected to a rod with a brake member at one end for holding engagement with a fish line extending through the tubular spindle when the float is in a predetermined position. Means is provided for actuating the lever to release the fish line when the fisherman pulls on the line.

Background of the invention

This invention relates generally to fishing tackle and relates more particularly to fishhook depth adjusting means.

As is well known by fishermen, it is often desirable to change the depth of the fishhook and with some the fishing tackle of which I am aware, it is necessary to remove the float, and hook and sinker from the water in order to make a depth adjustment of the hook.

There are some types of fishing tackle wherein the fish line has fixed stop means above and below the float so that the float may move on the line between these fixed stops. Once the line has been cast into the water these stops are fixed even though they may be adjusted on that is an upper float and a lower float. The lower float these stops are fixed even though they may be adjusted on the line when the latter is removed from the water. Such a device is shown in Patent No. 1,982,573 issued to Coyne.

Another type of device is disclosed in the Cowsert Patent No. 2,763,088 wherein there is means for regulating the water displacement of the float to position the hook at the desired depth. However, the admission of water into the float is controlled by a manually actuated valve mechanism.

The Skvier Patent No. 2,825,175 discloses a plug or bait casting device and if a fish does not hit the plug or bait the fisherman is constantly working, pulling in the device and casting again. This device utilizes a double float that is an upper float and a lower float. The lower float is adapted to fill with water when the float assembly, hook and sinker have been cast into the water. The line runs through the floats so that the line, hook and sinker descend. When the lower float has filled sufficiently with water it sinks and carries a stem downwardly with it to bring an enlarged head on the stem into securing position to hold the line against further descent. While the line may be pulled upwardly to raise the hook while the assembly is in the water it cannot descend again unless the tackle is removed and the water drained from the lower float and the tackle cast again.

The present invention provides a device whereby the fisherman may raise or lower the effective depth of the fishhook without removing the tackle from the water.

The invention also provides a device whereby the sinker will go to the bottom so that the fisherman may fish on the bottom without the float or bobber drifting or crawling up the fish line.

Summary of the invention

The present invention is for still fishing. In this type of fishing the float is allowed to rest or even drift if there is a current and the present invention comprises a float or bobber with a tubular spindle extending therethrough and through which a fish line is received, the spindle tapering to provide a fixed break part. Adjacent one end there is a lever pivoted to the spindle and having one end of a wire or rod pivotally attached thereto. The wire or rod extends through the spindle and has an inverted cone-shaped brake member cooperable with the brake part at the upper end of the spindle to clamp the fish line when the lever is in the braking position. The lever is adapted to be raised by pulling slightly on the line at which time the brake is released and the line may be allowed to descend under the weight of the sinker, hook and bait or the line may be pulled upwardly. Upon release of tension on the line the brake automatically sets and holds the line against movement through the spindle so that the hook is held at the desired depth.

By reversing the line through the tubular spindle the sinker and baited hook will sink to the bottom when the tackle is cast into the water. When the sinker gets to the bottom the float takes a position securing the line against movement through the spindle so that the float will not drift or crawl or creep up the line.

Referring to the drawings, which are for illustrative purposes only:

FIG. 1 is a perspective of fishing tackle embodying the present invention;

FIG. 2 is an enlarged sectional view taken on line 2—2 of FIG. 1 showing the brake in a released position;

FIG. 3 is an enlarged side view with parts broken away to show the parts of the brake mechanism in the braking position;

FIG. 4 is a perspective view showing the mechanism with the line reversed through the spindle and while the sinker and baited hook are descending; and FIG. 5 is a similar view showing the mechanism after the hook has reached the bottom and the float has assumed a position whereby the brake has secured the line against movement relative to the line.

Referring to FIGS. 1, 2 and 3 of the drawings, there is shown a float or bobber 10 having a passage 12 therethrough, said passage being vertical as seen in said FIGS. 1, 2 and 3. While the float is shown as being of cork it may be of any other suitable material, or it may be hollow instead of solid.

A spindle assembly, indicated generally at 14, comprises a hollow tubular spindle 16 which is disposed in the passage 12 and fits snugly enough therein to be frictionally held in position in the float although it may be removed by being pulled therefrom, or inserted into said passage, if the fisherman so desires. The spindle 16 may, of course, be otherwise secured in the float.

Adjacent to but spaced from the lower end of the spindle 16 there is an annular, exterior collar 18 which is press fitted onto the spindle or otherwise suitably secured thereon. The spindle 16 is so positioned in the passage 12 that the collar abuts against the adjacent portion of the float.

A portion of the spindle tube extends below the collar and there is a slot 20 extending from the lower free end 22 of said tube 16. Diametrically opposite said slot 20 there is a slot 24 between said free end 22 and the collar 18. The upper or opposite end of the spindle 16 extends outwardly beyond the top side of the float and tapers longitudinally upwardly and inwardly, there being a reduced diameter opening 26 at the outer end smaller end of the tapered end portion, indicated at 28.

One end of a lever, indicated generally at 30, extends through the slot 20 and an arcuate end portion 32 extends through the slot 24, said lever being pivotally mounted to said spindle 16 by means of a pivot pin 34 which has its end portions received in aligned openings provided therefor in the wall of the spindle, said end portions of the pivot pin 34 being press fitted or otherwise secured in said openings in the wall of the spindle. The longer outer free end portion 36 of the lever extends outwardly of the spindle through the slot 20 and is provided with a weight 38 of lead or other suitable material and there is an eye 40 at the outer end of the weight, said eye having a stem, not shown, embedded in the weight to thereby secure said eye to the weight.

There is a rod 42 extending longitudinally in the spindle 16, the lower end of said rod having a laterally turned end portion 44 pivotally disposed in an opening provided therefor in the lever portion within the spindle tube. From the outer end of said laterally turned end portion 44 of rod 42 there is a free end portion that is turned at right angles to said portion 44 and downwardly to maintain the operable connection between the lower end of the rod 42 and said lever. It is to be noted that the connection between the lower end of the rod and the lever is spaced radially outwardly of the pivot pin and generally to one side thereof.

To the upper or opposite end of the rod 42 is fixed or secured a movable brake member 48, said movable brake member being in the shape of an inverted cone with a portion of the smaller end received in the opening 26 at the outer end of the tapered portion 28 of the spindle. The outer and larger end of the movable brake member 48 is of greater diameter than the opening 26 and when the lever 30 is in what may be termed the raised position whereby the longer end portion of the lever is positioned adjacent the float, the brake member 48 is in the release position. When the outer or longer portion of the lever is moved away from the float the brake member 48 is moved into the opening 26 to a braking position whereby it clamps the line against the edge defining said opening 26.

Still referring to FIGS. 1, 2 and 3 wherein the device is in its normal upright position when floating in the water, a fish line 50 extends into the opening 26, through the spindle 16. The lower end of the fish line 50 has a sinker or weight 52 of known character attached thereto. A fishhook 54 is attached to the line 50 by a suitable line and/or leader in the usual manner.

Means is provided for operably connecting the fish line 50 to the eye 40 at the outer free end of the weight 38, and this operable connection, indicated generally at 58, comprises a small ball 60 having one end of a piece of leader material 62 embedded therein. The other end of said leader material is embedded in a small ball 64, a small loop 66 of the material extending outwardly of the ball 64. There is a snap-on leader pin 68 removably attached to the eye 40 and connected to the ball 64 by means of the loop 66.

Ball 60 has a passage 70 therethrough in which the fish line 50 is slidably disposed and the length of the connection 58 is such that when the line 50 is raised somewhat by the fisherman, as best shown in FIGS. 1 and 2, the lever 30 is raised sufficiently to move the movable brake member 48 to a release position so that the line 50 may be pulled upwardly through the spindle and downwardly by the sinker. However, when the line 50 is relaxed by the fisherman the weight 38 causes the lever to move in a clockwise direction, as viewed in FIGS. 1, 2 and 3 thereby pulling the movable brake member downwardly and clamping the fish line against the edge portion of the tube defining the opening 26 so that the line is held against movement through the spindle tube. The brake holds the line, and hence the baited hook at the desired depth. The various parts of the device are then positioned as shown in FIG. 3.

Thus, by pulling the line 50 to raise the lever 30 the brake is released and the line may be pulled upwardly to raise the hook and sinker or it may be relaxed just sufficiently to permit the sinker to pull the line downwardly to lower the hook. This adjustment of the position of the hook may be effected without removal of the tackle from the water.

When the device is to be used for fishing on the bottom of the body of water the fish line is reversed in the tubular spindle, as shown in FIGS. 4 and 5, the connection 58 not being used. When thus used, the bobber or float with the spindle assembly carried thereby is cast into the water. The sinker and baited hook causes the float to tilt with the end of the spindle tube pulled downwardly. The lever 30 then moves to a brake release or brake-off position until the sinker strikes the bottom. When the sinker strikes the bottom the bobber or float automatically rights itself, as shown in FIG. 5, the lever 30 then pivotally moving to the brake-on position so that the float is secured to the line 50 to prevent relative movement between the float and the line thereby preventing the bobber from crawling up on the line or from drifting. The bobber then remains in this position until disturbed by a fish or until retrieved by the fisherman.

I claim:
1. A fishing device, comprising:
   (A) a float;
   (B) a spindle assembly carried by said float, said spindle assembly including
       (a) a tubular spindle open at the ends, a part of spindle defining the opening at one end,
       (b) a brake mechanism comprising a lever pivoted to said spindle adjacent the other end, there being a fixed brake member defined by the end of the spindle defining said opening at said one end, a movable brake member associated with said one end of said spindle and movable relative thereto, and connecting the lever with said movable brake member for moving the latter toward and away from said one end.

2. The invention defined by claim 1, wherein the lever has an outer free end, said outer free end being weighted.

3. The invention defined by claim 2 wherein the spindle extends through the float and when the float is in the water the lever end of the spindle is normally at the bottom and said lever is in the brake on position.

4. The invention defined by claim 1, wherein the spindle is secured in a passage through the float, and said one end of the spindle tapers to define an opening of reduced diameter relative to the diameter of the main portion of the spindle, and the movable brake member is in the shape of an inverted cone cooperable with the reduced open end of said spindle for clamping a line extending through the spindle, against the edge of the spindle defining said reduced diameter opening.

5. The invention defined by claim 3 wherein there is connection means having one end connected to said free end of the lever, and the other end adapted to be connected to a line extending through the spindle, said other end of the connecting means being slidably disposed on said line ahead of the upper end of the float when the latter is in its normal floating position.

6. The combination of the invention defined by claim 3 with a line extending through the spindle from the end having the brake, and there is connecting means having one end connected to the outer end of said lever, the other end of said connecting means having a sliding connection with the line ahead of the brake end of the spindle, said connecting means being shorter than the distance from the outer end of the lever when positioned away from the float to the brake end of the spindle.

7. The invention defined by claim 6, including a weight on the portion of the line extending from the lever end of the spindle.

8. The combination of the invention defined by claim 3 with a line extending for the lever end of the spindle and through said spindle.

References Cited

UNITED STATES PATENTS

| | | | |
|---|---|---|---|
| 2,221,437 | 11/1940 | Allison | 43—44.91 X |
| 2,493,971 | 1/1950 | Johnson | 43—44.91 |
| 2,531,806 | 11/1950 | Coughlin | 43—44.91 |
| 2,825,175 | 3/1958 | Skvier | 43—44.91 |
| 2,861,382 | 11/1958 | Rosenberg | 43—44.91 |
| 3,353,294 | 11/1967 | Mundorff et al. | 43—44.91 |

SAMUEL KOREN, *Primary Examiner.*

D. J. LEACH, *Assistant Examiner.*

U.S. Cl. X.R.

43—44.91